(12) United States Patent
Grant

(10) Patent No.: US 8,371,074 B2
(45) Date of Patent: Feb. 12, 2013

(54) MAST ASSEMBLY FOR WIND TURBINE

(75) Inventor: Christopher Bernard Grant, Long Sault (CA)

(73) Assignee: ReDriven Power Inc., Iroquois (CA)

( * ) Notice: Subject to any disclaimer, the term of this patent is extended or adjusted under 35 U.S.C. 154(b) by 0 days.

(21) Appl. No.: 12/780,504

(22) Filed: May 14, 2010

(65) Prior Publication Data

US 2010/0313495 A1    Dec. 16, 2010

Related U.S. Application Data

(60) Provisional application No. 61/178,682, filed on May 15, 2009.

(51) Int. Cl.
*E04H 12/34* (2006.01)
(52) U.S. Cl. .......................... 52/119; 52/116; 52/745.17
(58) Field of Classification Search .................. 52/116, 52/119, 123.1, 745.17, 745.18; 248/519, 248/523; 212/292, 293, 297, 299; 254/93 R, 254/93 H, 89 H; 290/44, 55; 412/132 B
See application file for complete search history.

(56) References Cited

U.S. PATENT DOCUMENTS

| | | | | |
|---|---|---|---|---|
| 2,331,373 | A | * 10/1943 | Campbell | ...................... 285/119 |
| 3,109,523 | A | * 11/1963 | Moller | ............................. 52/115 |
| 3,561,616 | A | *  2/1971 | Eddy et al. | ................. 414/22.53 |
| 3,778,940 | A | * 12/1973 | Blecken | .......................... 52/116 |
| 4,606,155 | A | *  8/1986 | Bukovitz et al. | ................ 52/116 |
| 4,923,174 | A | 5/1990 | Loechner | |
| 5,058,336 | A | 10/1991 | Jenvey | |
| 5,438,805 | A | 8/1995 | McCrary | |
| 6,652,194 | B2 | 11/2003 | Ingle | |
| 7,192,252 | B2 | 3/2007 | Duguet et al. | |
| 7,458,328 | B2 | * 12/2008 | Hall | ................................ 114/91 |
| 2008/0127872 | A1 | 6/2008 | Hall | |
| 2009/0019794 | A1 | 1/2009 | Centelles Vilalta | |

FOREIGN PATENT DOCUMENTS

| | | |
|---|---|---|
| CN | 2763570 Y | 3/2006 |
| CN | 201198815 Y | 2/2009 |
| CN | 201202585 Y | 3/2009 |
| CN | 101429923 A | 5/2009 |
| CN | 101534090 A | 9/2009 |
| CN | 201363242 Y | 12/2009 |
| FR | 2920206 A1 | 2/2009 |
| GB | 2445157 A | 7/2008 |
| JP | 2002-147339 A | 5/2002 |
| JP | 2007-40285 A | 2/2007 |
| WO | WO 0036299 A1 | 6/2000 |

OTHER PUBLICATIONS

Dempster, Victoria; Search Report from corresponding PCT Application No. PCT/CA2010/000719; search completed Aug. 30, 2010.

* cited by examiner

*Primary Examiner* — Brian Glessner
*Assistant Examiner* — Adam Barlow
(74) *Attorney, Agent, or Firm* — John R. S. Orange; Blake, Cassels & Graydon LLP

(57) ABSTRACT

A mast assembly having a base, and a mast pivotally connected to the base for movement between a horizontal and an upright position. A linear actuator is connected between the base and the mast and is extensible to move mast about the pivot. A strut is selectively positioned between the mast and the base to inhibit pivotal movement toward the horizontal position during lifting of the mast. A plurality of abutments on the base permits selective connection between the actuator and the base. The strut position supports the mast while said actuator is moved between the abutments.

15 Claims, 4 Drawing Sheets

MAST ASSEMBLY FOR WIND TURBINE

CROSS REFERENCE TO RELATED APPLICATIONS

This application claims priority from U.S. Provisional Application No. 61/178,682 filed on May 15, 2009; the contents of which are incorporated herein by reference.

FIELD OF THE INVENTION

The present invention relates to a mast assembly and a method of erecting such an assembly.

SUMMARY OF THE INVENTION

A mast assembly is used where a device needs to be elevated in order to perform effectively. Such apparatus may for example be a light structure, a sign, a telecommunications antenna or a wind power turbine. The elevation obtained from the mast will vary and for high value equipment or significant elevations, a customized assembly process can be justified. However, there are many applications where a relatively modest elevation is required and customized assembly of the mast and the equipment cannot be economically justified.

Moreover, in some situations it is necessary to provide for ongoing maintenance and repair of the equipment supported by the mast which makes dismounting of the mast desirable.

A typical application requiring a simple but robust method of erecting a mast is in the installation of relatively small wind powered generators. These generators may be installed in a location to supply power to meet the needs of an individual residence and therefore their erection does not justify the expense of custom installation. Nevertheless, the mast may typically range from 16 to 30 meters high and the mass of the turbine mounted on the upper end of the mast makes raising of the mast difficult. It is also desirable to be able to lower the mast in the event of inclement weather to avoid damage to the turbine, or other equipment mounted on the mast.

One proposal to facilitate the erection of the mast is to pivot the mast to a base and utilize hydraulic cylinders between the base and the mast to move the mast from a horizontal to a vertical position. The mast may then be bolted to the base to maintain it in a stable position. However, with this arrangement the large moment arm presented by the mast and turbine assembly and the distance through which the hydraulic pistons must act requires the use of a pair of multi stage telescopic hydraulic actuators. These actuators are relatively expensive and add significantly to the cost of the installation.

It is therefore an object of the present invention to provide a method and apparatus for erecting a mast in which the above disadvantages are obviated or mitigated.

In general terms, the present invention provides a mast assembly having a base and a mast pivotally connected to the base for movement between a horizontal and upright position. A linear actuator is connected between the base and the mast and is extensible to move the mast about the pivot. A strut is selectively engagable between the mast and the base to inhibit pivotal movement toward the horizontal position. The linear actuator can be selectively positioned in one of a plurality of abutments on one of the base and the mast so that when the strut is positioned to support the mast, the actuator can be moved between the plurality of abutments. In this way, a single stage hydraulic cylinder may be used with a stroke less than that needed to accomplish movement from horizontal to vertical position. The provision of the strut allows repositioning of the cylinder during erection so that the required range of movement can be achieved without resorting to multistage cylinders.

Preferably, the plurality of abutments are formed on the base in a cam track. The strut similarly moves along a cam track having a pair of notches so that after initial extension of the cylinder, the strut is engaged between the mast and the first of the notches along the motor to be retracted. Further extension moves the strut into the second notch allowing repositioning of the actuator for further pivotal movement.

BRIEF DESCRIPTION OF THE DRAWINGS

An embodiment of the invention will now be described by way of an example only with reference to the accompanying drawings in which.

DETAILED DESCRIPTION OF THE INVENTION

Figure 1:
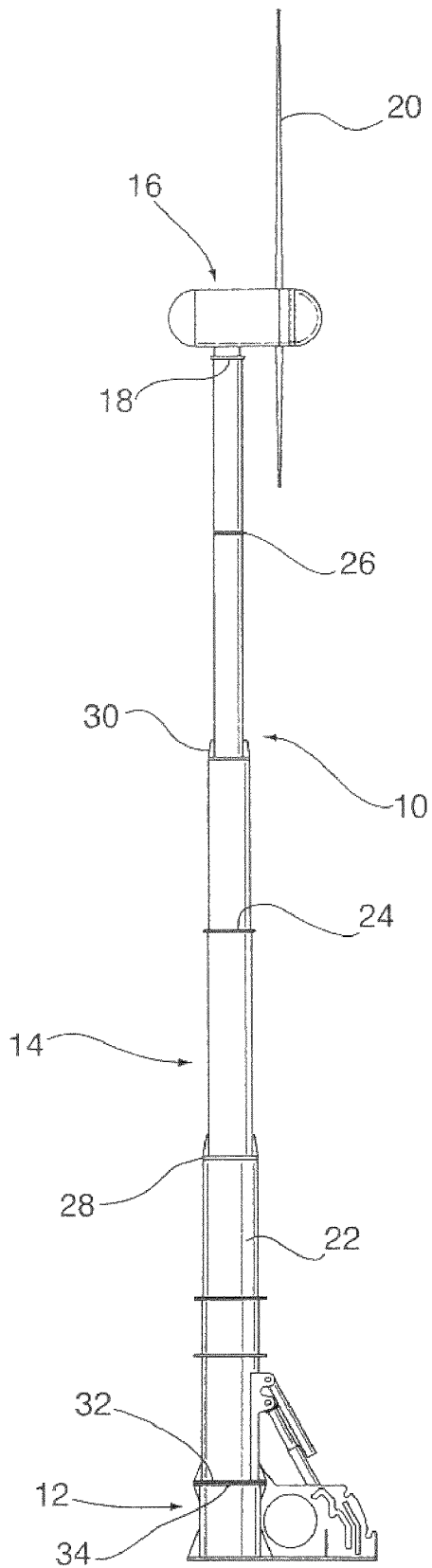
FIG. 1 is a side elevation of a wind turbine.

Referring therefore to FIG. 1, a wind turbine generally indicated 10 includes a base 12, a mast 14, and a generator assembly 16. The generator assembly 16 is mounted as a self contained assembly on a flange 18 at the upper end of mast 14 and has a blades 20 that rotate about a horizontal axis to generate power in a conventional manner.

The mast 14 is formed from a number of sections, namely, lower section 22, middle section 24 and upper section 26, that are bolted to one another at flanges 28, 30 respectively to form a unitary construction. Alternatively the tower can also be formed by different types of construction such as a slip fit design where there are no bolts or flanges. This alternate design is boltless and the sections secure themselves via compression between the sections to hold them together. The overall length of the mast may be 16 to 30 metres in typical applications to support a generator 16 having blades 20 of an overall length of 2 metres to 8 meters. It will be appreciated that the dimensions, including the overall height of the mast may vary to suit particular applications and the loads that may be imposed on the mast.

The lower section 22 of the mast 14 is provided with a flange 32 that abuts against a flange 34 provided on the upper side of the base 12. The flanges 32, 34 are connected by a hinge 36 formed between ears 38, 40 extending from the flanges 32, 34 respectively. A pin 42 passes between the ears 38, 40 to define a pivot axis between the mast 14 and base 12 that is offset to one side of the mast 14. The mast 14 is therefore able to pivot from a generally horizontal position, as shown in dashed outline in FIG. 2, to an upright, generally vertical position as shown in solid lines in FIG. 2.

A linear actuator 44 which is conveniently in the form of a double acting hydraulic motor, extends between the base 12 and the mast 14 to effect pivotal movement about the pin 42. The actuator 44 has a piston rod 46 that is secured to a clevis 48 defined between a pair of plates 50, 52 welded to the lower section 22 of mast 14. A bolt 54 passes between the plates 50, 52 and through boss 55 on the rod 46 to pivotally connect the rod to the mast. The rod 46 slides within a cylinder 56 that is located between a pair of walls 58, 60 that form part of the base 12.

Each of the walls 58, 60 has a cam track indicated at 62 formed in it that controls relative movement between the cylinder 56 and base 12. A connector in the form of a bolt 64 is connected to the cylinder and extends to either side into the cam track 62. The cam track 62 has a lower closed end 65 and pair of notches 66, 68 respectively formed in the lower edge of the track. The end 65 and notches 66, 68 form apertures to receive the bolt 64 at different pivotal positions of the mast on the base. The notch 66 is located at the mid point of the cam track 62 and is dimensioned to be able to receive the bolt 64 and maintain it in a stable position. The notch 68 is located at the upper end of the cam track 62 and similarly is dimensioned to receive the bolt 64 in a stable location. The end 65 and notches 66, 68 provide three abutments for transferring load from the actuator 44 to the base 12.

A strut 70 is connected to the mast 14 through a clevis 72 located immediately above the clevis 48. The strut 70 is connected to the clevis 72 by a pin 74 and the lower end of the strut 70 has a pair of cylindrical knobs 76 that project to opposite sides of the strut 70. The strut 70 is formed from a tube and has sufficient buckling strength to be able to support the load imposed by the mast 14 when in a horizontal or inclined position.

The outer vertical edge of the walls 58, 60 is formed with a pair of notches 78, 80 that are dimensioned to received the knobs 76 and hold them in a stable position. The walls 58, 60 are reinforced by reinforcing strips 82 so as to resist buckling when loads are imposed by the strut on the walls.

Figure 2:
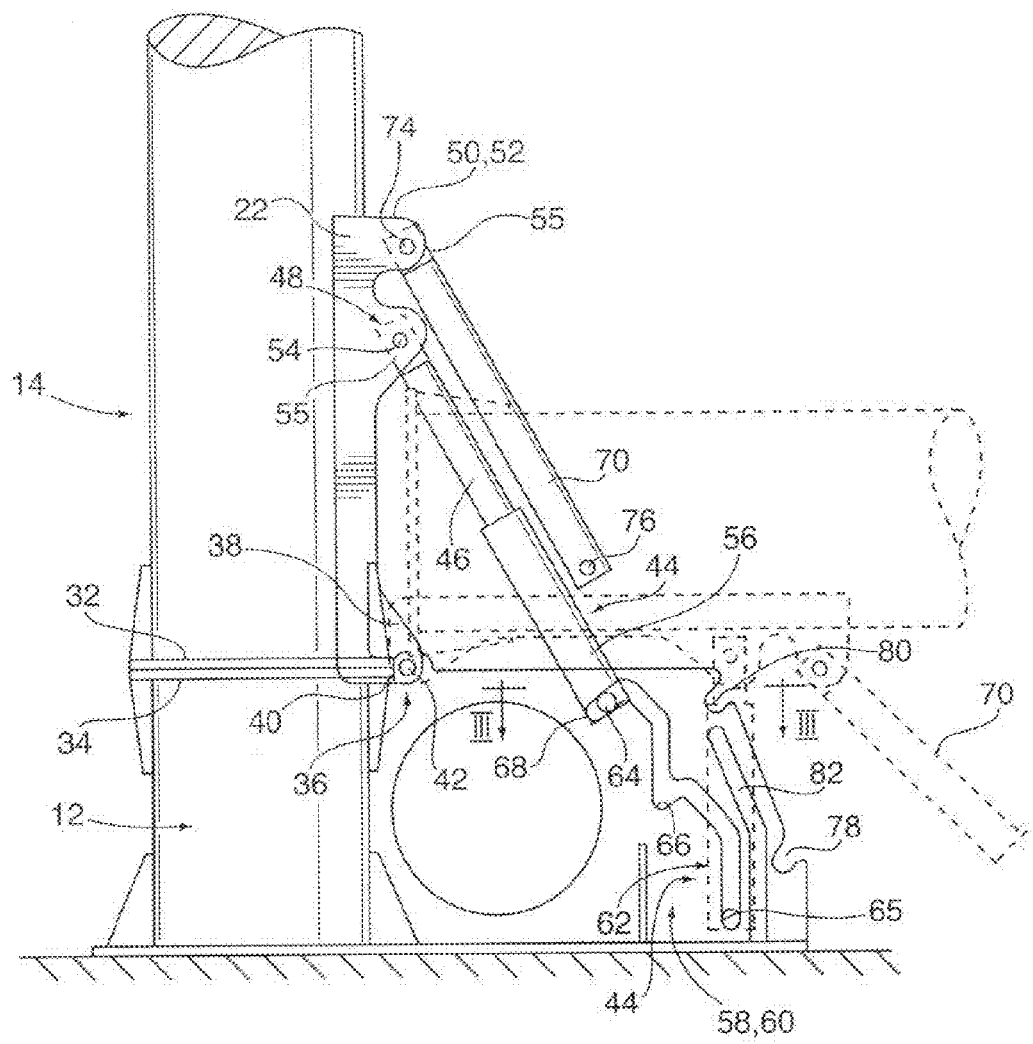
FIG. 2 is a view on an enlarged scale of a portion of the turbine shown in FIG. 1.
Figure 3:
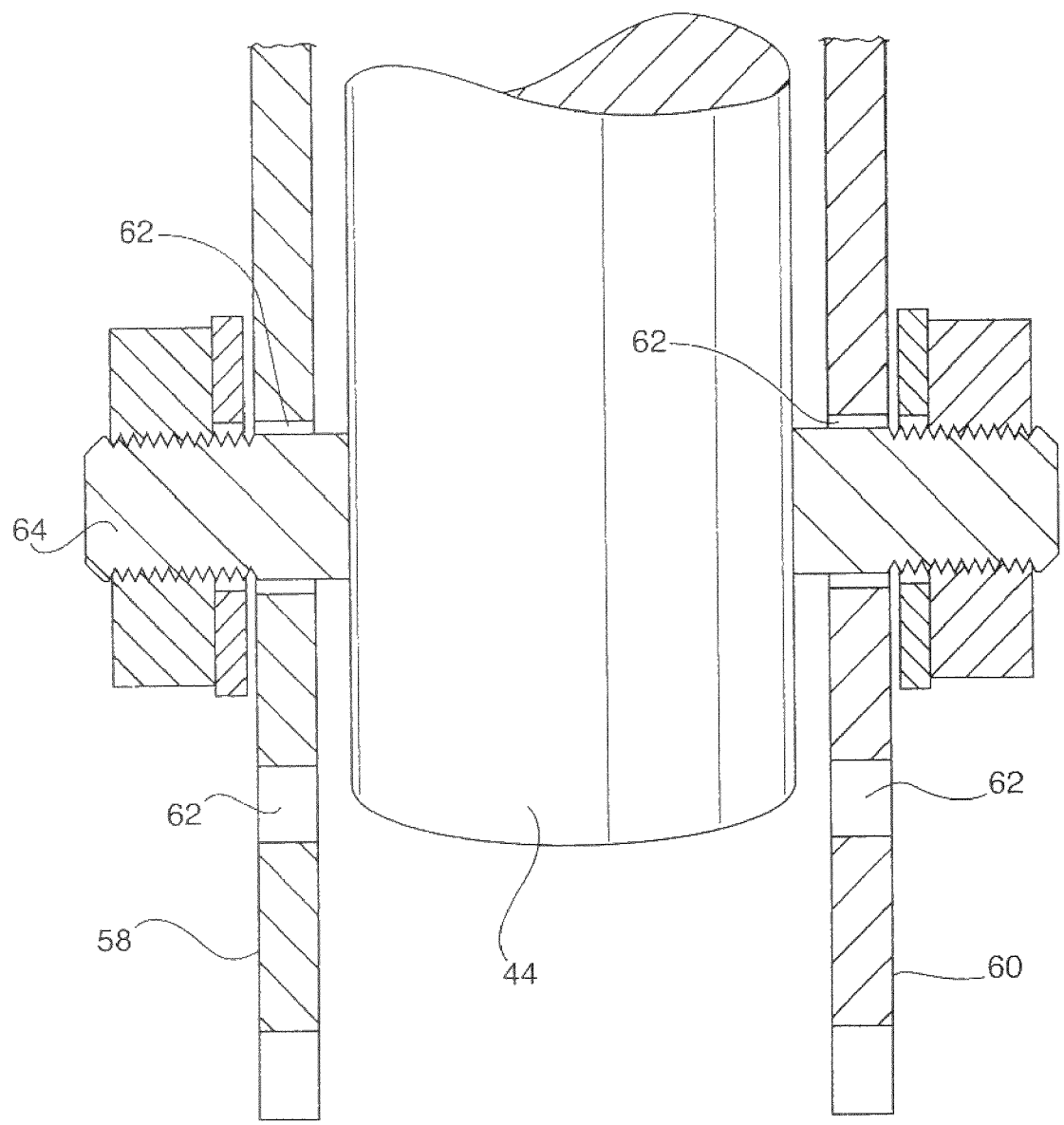
FIG. 3 is a front section on the line of FIG. 2.

In order to erect the mast 14, it is initially connected by the pin 42 to the base 12 and extends in a horizontal direction as shown in FIG. 2. In that position, the generator assembly 16 may be attached to the mast and the necessary commissioning and servicing performed prior to the mast 14 being erected.

When the mast is ready to be erected, the actuator 44 is connected to the clevis 48 by the bolt 54 and the lower end of the cylinder 56 connected to the cam track 62 by the bolt 64. Initially, the actuator 44 is fully retracted and the bolt 64 abuts against the closed end 65 of the track 62. The strut 70 is also connected to the clevis 72 through the pin 74 and rests against the base 12. The actuator 44 is connected to a hydraulic power pack to supply hydraulic fluid to the cylinder 56 and extend the rod 46 from the cylinder. Preferably, the power pack is located in the base 12 and includes a reservoir and an electrically driven pump to supply the pressurised fluid. The cylinder 56 and rod 46 are dimensioned to have sufficient diameter so that the vertical loads imposed by the mast can be overcome.

Figure 4:
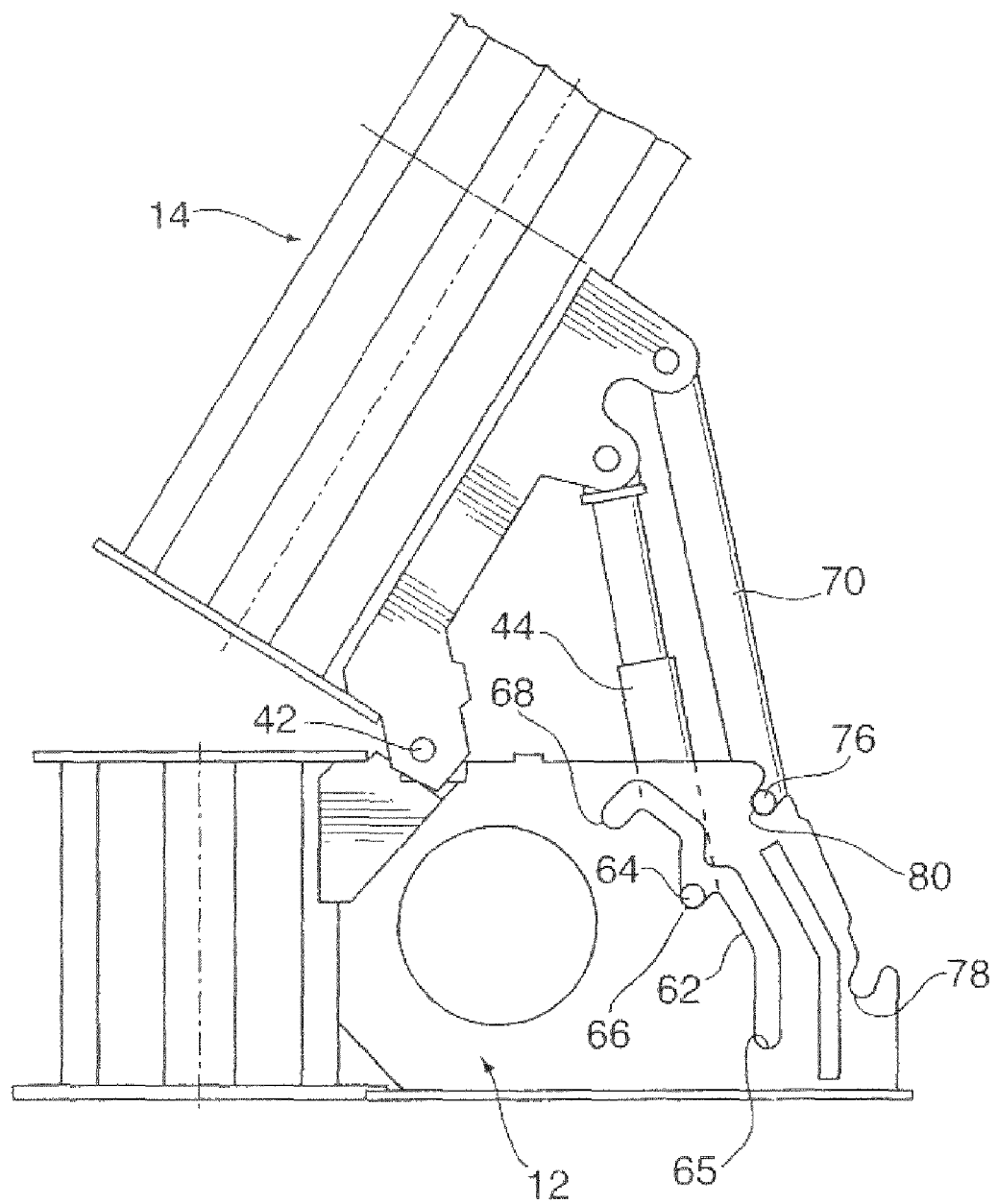
FIG. 4 is a view similar to FIG. 2 showing the mast of FIG. 1 in an intermediate position.

As shown in FIG. 4, as the actuator 44 extends, the mast 14 pivots about the pin 42 and moves from a horizontal towards an upright position. During this movement, the bolt 54 abuts the end 65 of the cam track 62 and the lower end of the strut 70 moves along the outer edge of the plates 50, 52 toward the notch 66.

As the actuator 44 reaches the limit of its stroke, the knobs 76 drop into the notch 78. The hydraulic supply to the actuator 44 can then be reversed to retract the rod into the cylinder. The strut 70 supports the mast in a stable inclined position and retraction of the rod 46 causes the bolt 54 to move along the cam track 62 towards the notch 66. As the actuator 44 reaches the minimum length, the bolt 64 drops into the notch 66 to provide a further stable connection between the base 12 and the mast 14. Thereafter, the actuator 44 may again be extended to continue pivotal movement of the mast 14 relative to the base 12 and to pull the strut 70 along the outer surface toward the notch 80. Extension of the actuator 44 continues until the knobs 76 are aligned with the notches 80 at which time the actuator 44 can again be retracted to move the bolt 64 into the notch 68. Continued extension of the actuator 44 completes the pivotal movement of the mast whilst carrying the strut 70 out of the notch 80. In this manner, the actuator 44 can be stepped along the cam track 62 to supply successive lifting forces. The strut 70 is operable to maintain the mast in a stable position whilst the actuator 44 is being repositioned.

Once in an upright position, the flanges 32, 34 are bolted to one another to provide a rigid connection and the actuator 44 may be removed or it can stay attached to the tower for local storage.

It will of course be appreciated that if it becomes necessary to lower the mast for servicing or changing of components, the reverse operation may be completed to provide a controlled lowering through the alternate use of the strut and the actuator.

It will also be appreciated that the cam track 62 can be located on the mast with a fixed pivot connection to the base and that the number of notches along the cam track may be increased or decreased to suit a particular application. The actuator 44 may be a mechanical actuator, such as a recirculating ball, screw jack, if preferred.

It is also possible to provide the abutments between the actuator and the base as individual holes, rather than notches connected by the cam track 62. With this arrangement, which enhances the stability of the walls 58, 60, the bolt 64 is formed as a removable pin that is inserted through the holes and a bearing on the actuator to connect the actuator and base. When the mast is supported by the strut, the pin is withdrawn and the actuator reposition so as to be aligned with the adjacent hole. Similarly, the connection between the strut and base can be formed as individual holes with a removable pin if preferred.

Although the invention has been described with reference to certain specific embodiments, various modifications thereof will be apparent to those skilled in the art without departing from the spirit and scope of the invention as outlined in the claims appended hereto. Although the mast assembly has been described in the context of supporting a wind turbine, it will be appreciated that other equipment may be supported in the mast, such as lights, antennas, and signs. The entire disclosures of all references recited above are incorporated herein by reference.

What is claimed is:

1. A mast assembly having a base, a mast pivotally connected to the base for movement between a horizontal and an upright position, an actuator connected between said base and said mast and operable to move mast about the pivot and a strut separate from said actuator and selectively engagable between said mast and said base to inhibit pivotal movement toward said horizontal position, an attachment to secure one end of said actuator to one of said mast and said base, a plurality of abutments on one the other of said base and said mast to receive the opposite end of said actuator, and abutments being spaced from one another and at different distances from said attachments to permit selective connection between said actuator and a respective one of said abutments at different locations as said mast moves between said horizontal and upright positions, said strut extending between said base and said mast to support said mast while said actuator is moved between said plurality of abutments.

2. A mast assembly according to claim 1 wherein said actuator is a linear actuator.

3. A mast assembly according to claim 2 wherein said abutments are located on said base.

4. A mast assembly according to claim 3 wherein said actuator is pivotally connected to said mast.

5. A mast assembly according to claim 3 wherein said base includes a pair of Laterally spaced walls and said actuator is located between said walls, said abutments being formed on each of said walls.

6. A mast assembly according to claim 5 wherein a connector extends between said actuator and said abutments to connect the actuator to said walls.

7. A mast assembly according to claim 6 wherein said abutments include apertures in said walls and said connector engages said apertures.

8. A mast assembly according to claim 7 wherein said apertures are connected by a cam track to guide said connector between said abutments.

9. A mast assembly according to claim 8 wherein said apertures are formed as notches at spaced locations along said cam track.

10. A mast assembly according to claim 1 wherein said strut is selectively engagable with said base.

11. A mast assembly according to claim 10 wherein said strut is pivotally connected to said mast.

12. A mast assembly according to claim 11 wherein said strut engages an aperture in said base when said mast is between said horizontal and upright position, thereby permitting repositioning of said actuator to a different one of said abutments.

13. A mast assembly according to claim 12 wherein said aperture is provided by a notch in said base to receive a connector extending between said strut and said base.

14. A mast assembly according to claim 12 wherein at least three abutments are provided on said base for said actuator and at least two apertures are provided for selective engagement of said strut.

15. A method of positioning a mast assembly having a base, a mast pivotally connected to the base for movement between a horizontal and an upright position, an actuator connected between said base and said mast and operable to move mast about the pivot and a strut selectively engagable between said mast and said base to inhibit pivotal movement toward said horizontal position, a plurality of abutments on one of said base and said mast to permit selective connection between said actuator and one of said abutments, said method comprising the steps of connecting said actuator to one of said abutments, operating said actuator to pivot said mast relative to said base and move said strut in to a position whereby said strut supports said mast, moving said actuator from said one abutment to an adjacent abutment, and continuing operation of said actuator to pivot said mast relative to said base.

\* \* \* \* \*